Oct. 29, 1929.  E. A. PORTER  1,733,693

TOGGLE BOLT

Filed Jan. 22, 1927

Inventor:
Edward A. Porter,

By H.S. Woodward
Attorney

Patented Oct. 29, 1929

1,733,693

UNITED STATES PATENT OFFICE

EDWARD A. PORTER, OF BRATTLEBORO, VERMONT

TOGGLE BOLT

Application filed January 22, 1927. Serial No. 162,767.

The invention relates to toggle or expansion bolts of that type in which a bar-like member may be mounted on a bolt or screw in such manner that it may be inserted with the bolt and nut through an opening in a wall or other element and the bar then moved into position transversely to the bolt to support the nut and prevent its withdrawal. It has for an object to enable the embodiment of such a device in a manner to be utilized with a very small opening through the wall or the like. A further important purpose is to present a device with a maximum strength in proportion to its size and the size of the opening through which it may be inserted. A further purpose is to effect a novel coordination between the bolt nut and bar whereby compactness is effected and also coaction in securing the bolt accomplished in a novel manner. A further important purpose is to give a construction by which the device may be used either with the bolt head at the inner side of a wall partition, floor or ceiling, or with the nut so located, the nut being manipulatable on the exterior in the one instance, and the bolt or screw head in the other. Economy in manufacture is also an important attainment.

Additional objects, advantages and features of invention are involved in construction and arrangement of parts as may be understood from the following description and accompanying drawings, in which Figure 1 is a plan of the blank for the bar.

Fig. 13 is a top view of Fig. 12.

Figure 1:
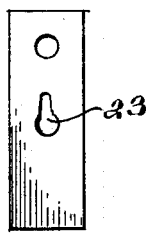
Figure 2:
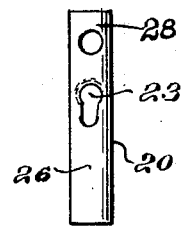
Figure 2 is a top view of the bar formed, full size, for insertion through a $\tfrac{5}{16}$-inch opening, which is also true of Figures 9, 10 and 11.
Figure 3:
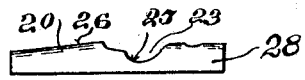
Figure 3 is a side view of the bar.
Figure 4:
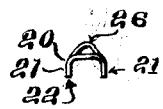
Figure 4 is an end view from the right of Figure 3.
Figure 5:
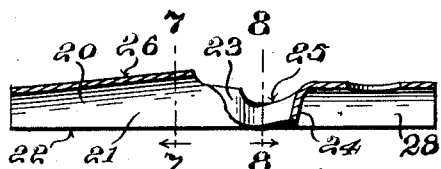
Figure 5 is an enlarged longitudinal section of the bar.
Figure 6:
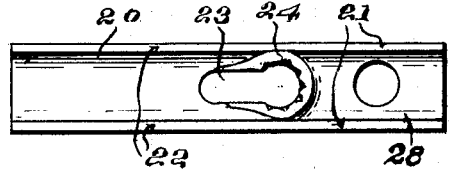
Figure 6 is an enlarged bottom view of the bar.
Figure 7:
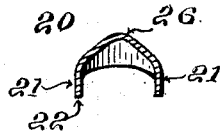
Figure 7 is a cross section on the line 7—7 of Figure 5.
Figure 8:
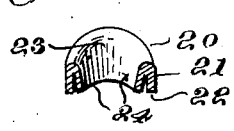
Figure 8 is a similar view on the line 8—8 of Figure 5.

There is illustrated a fastening comprising a bolt or screw 17, which may be of any usual manufacture, but preferably with threads of small pitch, such as on machine or stove bolts. Fitted to this bolt or screw 17 there is a nut 18 of conical form, the axis of the conic elements being coincident with the axis of the bolt when engaged. The sides of the nut are also formed with longitudinal serrations or corrugations 19. This nut is customarily engaged with the bolt with its larger part next the extremity of the bolt.

A bar 20 is shown formed of sheet metal pressed into substantially U-shaped form in cross section, and the sides 21 being planiform for a distance adjacent the longitudinal edges 22 of the bar to afford a maximum rigidity in supporting the stresses of use. An opening 23 slightly pear-shaped is formed midway of the width of the bar with the center of the larger part of the opening nearer one end than the other and the reduced part extending oppositely or toward the middle of the bar. Material 24 of the blank displaced to form the larger part of the opening is extended inwardly between the sides of the bar and across the space between the sides 21 in slightly conical form, but the elements of the conical surfaces here are in a different angular relation than the corresponding elements of the nut 18. This angularity of the projected elements of the nut and bar may differ either way but preferably the shape of the part 24 corresponds to a flatter cone or one with a more obtuse angle between the opposite elements. No material is pressed inward so as to extend between the sides 21 at the side of the opening 23 next the middle of the bar, which is at the smaller end of the opening; this being for the purpose of avoiding obstruction of relative pivotal movement of the bar on the nut and bolt, as will be explained.

It is also important to note that the lateral edges 25 of the opening 23 at the top side of the bar are curved longitudinally of the bar, being inclined downwardly toward the forward part of the opening to low points on each side just short of the narrowed inner end part of the opening and thence upwardly to said narrow part; and the adjacent central, bent portion 26 of the bar is pressed outwardly further adjacent the small end of the opening 23, and extends therefrom at a convergent inclination to the plane of the longitudinal edges of the bar.

The inturned material 24 around the opening 23 may be slightly grooved, corrugated or serrated to co-act with the corresponding parts of the nut to hold the latter against turning.

Figure 9:
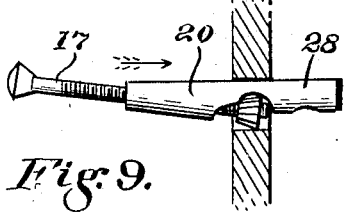
Figure 9 illustrates the insertion of the device through a partition.

In use, the bolt 17 may be inserted through the fixture to be mounted, then through the bar 20 from the under or recessed side, after which the nut is screwed on the bolt a short distance. A suitable opening having been bored or otherwise formed through the partition or wall upon which the fixture is to be secured, the bar is swung pivotally on the bolt or nut until the bolt rests in the portion 26, the bolt being adjusted with the nut so that the nut then rests in the recessed edge portion 25 at the sides of the opening 23, as shown in Figure 9. If the fixture is to be mounted on a vertical wall the parts in the arranged positions last mentioned are then inserted through the opening in the wall with the recessed side of the bar and the edges 22 at the upper side. The bolt being of proper length, the parts are simply moved as close to the face of the wall as convenient, and the bolt then drawn inwardly again until checked by the bar, which will have moved by gravity as indicated in Figure 10 as soon as it cleared the inner face of the wall material, so as to properly engage as shown in Figure 11 when drawn outwardly.

Figure 10:
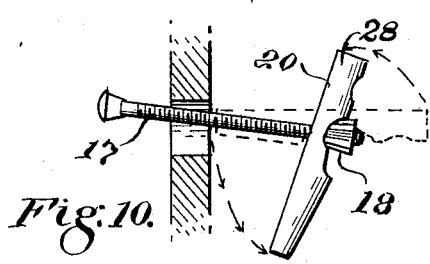
Figure 10 illustrates a further stage of use.

The material of the bar may be partly removed from the short portion 28 between the larger part of the opening 23 and the adjacent end of the bar, in order to lighten this end still further to facilitate the movement of the bar by gravity into operative anchoring position as shown in Figure 10.

The device may of course be varied in size to suit various demands of use, while still functioning in the same way.

Figure 11:
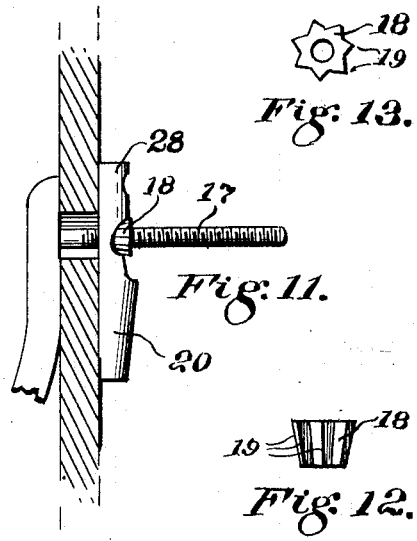
Figure 11 illustrates a fixture secured upon a partition of my device.
Figure 12:
Fig. 12 is an elevational view of the nut.

It will be appreciated that if desired the head of the bolt may be positioned where the nut is previously described and shown in Figures 9, 10 and 11, with corresponding advantages for some uses, as will be obvious from the requirements of the art.

As the nut is drawn snugly into the opening 23, any yielding of the side portions 24 of the opening will cause them to conform exactly to the slope of the sides of the nut so that a maximum bearing is secured regardless of variations from standard in manufacture and the maximum strength of the bar availed of. It should be noted that the double thickness of material beside the opening 23 all supports the nut, and in addition, the material of the part 24 connecting the opposite sides of the opening further reinforces the sides and prevents their spreading.

I claim:

1. A fastener comprising a bolt, a nut, and a bar, the bar having an opening therethrough, the sides of the opening being shaped to engage the nut against rotation when in anchoring position and recessed with edges curved longitudinally of the bar to afford a bearing at each side for the nut throughout operative movement of the bar on the nut on an axis transverse to the bolt and bar, part of the bar being recessed to receive the bolt at an acute angle to the bar.

2. The structure of claim 1 in which the nut is of larger diameter at its outer part than at its inner part and fits snugly corresponding surfaces of the opening through the bar.

3. The structure of claim 1 in which the bar is sheet metal in U-shaped form, material thereof being extended inwardly around the opening in close relation to the sides of the bar.

4. The structure of claim 1 in which the bar is sheet metal U-shaped in cross section, material of the bar being extended inwardly around the opening in close relation to the sides of the bar and being in the form of the frustrum of a cone, the nut being in the form of the frustrum of a cone of greater altitude.

5. The structure of claim 1 in which the bar is sheet metal U-shaped in cross section, material of the bar being extended inwardly partly around the opening and in close relation to each side of the bar, the opening being elongated slightly in pear shape next the bolt receiving part of the bar.

6. The structure of claim 1 in which the bar is sheet metal U-shaped in cross section, the opening being formed with a narrow extension next the bolt receiving part of the bar, the bent medial portion of the bar next the termination of the said extension of the opening being extended beyond the corresponding part adjacent the opposite side of the opening, material of the medial portion of the bar being extended inwardly around the larger part of the opening.

In testimony whereof I affix my signature.

EDWARD A. PORTER.